Dec. 26, 1950     H. V. ATWELL     2,535,343
METHOD OF SYNTHESIZING GASOLINE AND THE LIKE
Filed July 27, 1946
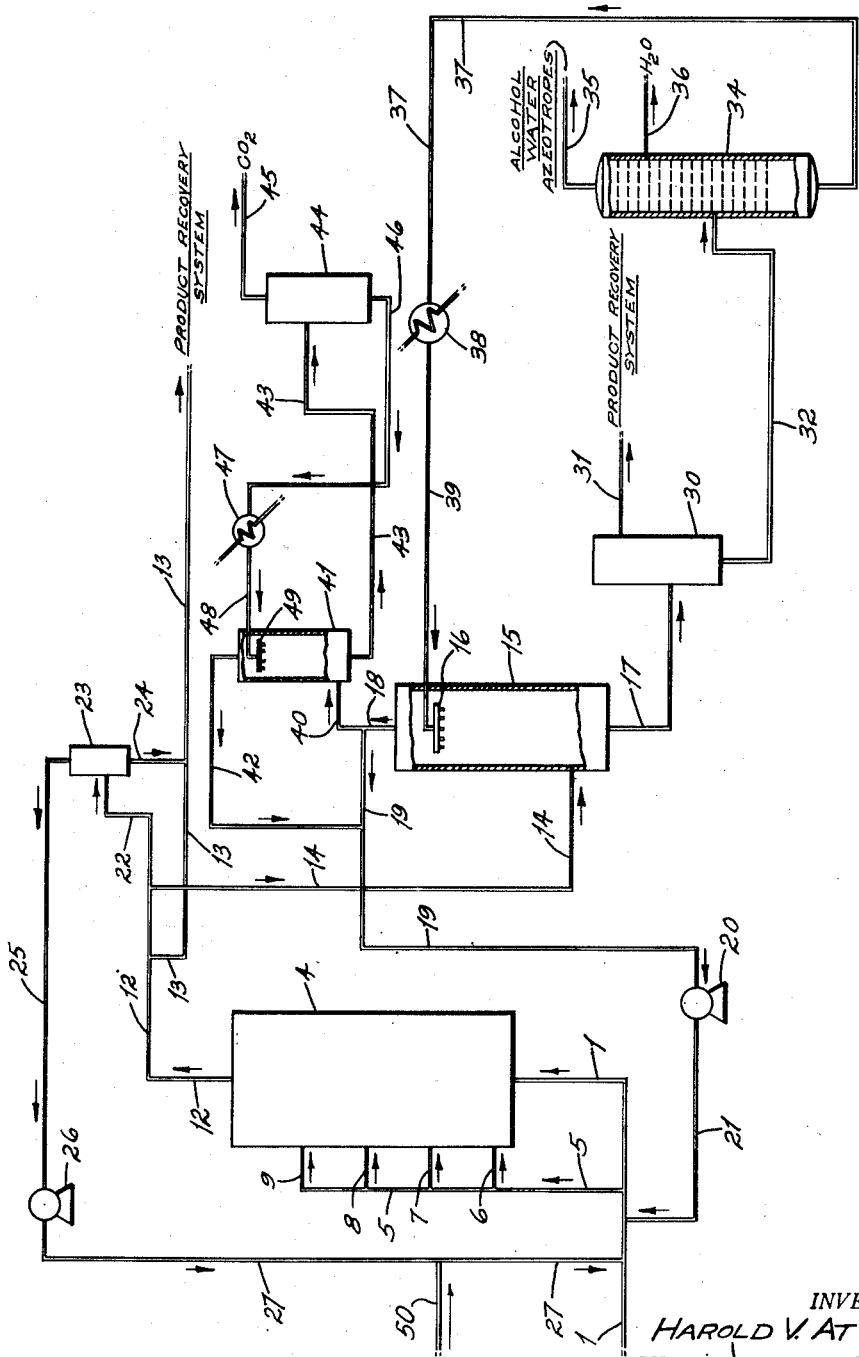
INVENTOR.
HAROLD V. ATWELL
BY Patented Dec. 26, 1950

2,535,343

UNITED STATES PATENT OFFICE 2,535,343

METHOD OF SYNTHESIZING GASOLINE AND THE LIKE

Harold V. Atwell, Beacon, N. Y., assignor to The Texas Company, New York, N. Y., a corporation of Delaware Application July 27, 1946, Serial No. 686,655

10 Claims. (Cl. 260—449.6)

This invention relates to the catalytic conversion of synthesis gas comprising carbon monoxide and hydrogen into hydrocarbons, oxygen-containing compounds and the like and more particularly to an improved method for effecting such conversion employing direct contact evaporative cooling.

The invention contemplates contacting synthesis gas with a catalyst in a conversion zone wherein the temperature is maintained within the desired range by direct contact evaporative cooling. An effluent is discharged from the conversion zone and is split into two streams. One stream is diverted to a product recovery system. The other stream from which the recycle streams are derived is further sub-divided into two portions. One portion is contacted with a cooling liquid, which advantageously is a selective absorbent for water or carbon dioxide, to effect at least partial condensation and removal of the normally liquid components present therein as well as removal of carbon dioxide when desired. The cooled uncondensed gas from this treatment is combined with the remaining portion so as to effect condensation of higher boiling constituents thereof in the form of a fog uniformly dispersed throughout a body of uncondensed gas. A stream comprising this resulting mixture of gas and highly atomized liquid is recycled to the conversion zone where the atomized liquid components serve as an evaporative coolant.

This invention prevents association of coolant with catalyst particles which interferes with the essential functions of reactant adsorption and product desorption from the catalyst active centers. It is particularly applicable with a fluidized solid catalyst operation wherein "muddying" or slurrying of the catalyst is to be avoided. The pre-atomization of the evaporative coolant eliminates the presence of large globules of liquid in the reaction zone which would result in mudding and agglomeration of a powdered or finely divided catalyst.

As a matter of fact, such an improvement is wrought in evaporative cooling technique by this invention that its use results in more uniform fluidization of catalyst in fluid operations. The volume decrease accompanying the conversion of hydrogen and carbon monoxide into hydrocarbons is offset by the vaporization of pre-atomized coolant.

The aforesaid liquid which is used to cool one of the recycle streams is advantageously an absorbent for water. Ethylene glycol is an example of a liquid which may advantageously be used to effect cooling of the recycle stream. The liquid coolant should have a relatively high boiling point so as to minimize carry-over of its vapor with non-condensed recycle gas. Propylene glycol, triethylene glycol and glycerine may also be used as liquid coolants.

Reduction of the water concentration in the recycle stream by the use of a selective absorbent for water such as ethylene glycol minimizes carbon dioxide formation in the conversion. Reduction of carbon dioxide formation in the conversion allows greater production of valuable hydrocarbon per unit of carbon introduced into the reactor.

As previously indicated the liquid which is used to cool the recycle stream may be a selective absorbent for carbon dioxide. The use of a carbon dioxide absorbent such as monoethanolamine may replace the use of a water absorbent for the cooling of the recycle stream. Alternatively, the recycle stream may be subjected to countercurrent contact with an absorbent for carbon dioxide in addition to the contact with a selective absorbent for water.

The removal of carbon dioxide from the recycle stream provides a hydrogen-rich recycle gas which is advantageous under reaction conditions for the suppression of coke and wax formation.

A recycle ratio expressed as volume of recycle gas per volume of fresh feed may be employed within the limits of about 0.5:1 to 4:1. Normally a 1:1 or 2:1 ratio is employed.

Reference will now be made to the accompanying drawing in order to present a fuller exposition of the method of the invention. The drawing presents the method of the invention diagrammatically since it is thought that the invention may be completely understood without reference to a more detailed sketch.

Synthesis gas comprising carbon monoxide is obtained from a source not shown through a conduit 1. Synthesis gas may be prepared by a number of well-known methods such as the water gas reaction or the oxidation of methane with a limited quantity of oxygen. The synthesis gas may be obtained at the desired temperature and pressure levels through the use of conventional heaters and compressors which are not shown.

Recycle gas, obtained from sources which will be described in detail later, combines with fresh synthesis gas in the conduit 1. A total reactor feed comprising fresh synthesis gas, recycle gas and evaporative coolant dispersed in the form of a fog is introduced into the reactor 4 through the conduit 1. Provision is made for multiple injection of the total reactor feed; a manifold pipe 5 connects with the conduit 1 and a desired portion of total reactor feed may be diverted through the manifold pipe 5 and introduced into the reactor 4 at successive points along the vertical dimensions of the reactor 4 through pipes 6, 7, 8 and 9. Multiple injection of reactor feed containing atomized coolant insures uniform removal of heat of reaction throughout the reactor 4.

In the reactor 4, there is maintained a fluidized mass of solid catalyst particles. The constitution of the catalyst and the nature of the desired products determines the temperature at which the conversion takes place in the reactor 4. In general, temperatures between about 250° F. and 700° F. are employed for the hydrogenation of carbon monoxide.

A space velocity which is defined as the volume of gas per volume of fluidized catalyst per hour is employed which lies between about 500 and 3000. Ordinarily a space velocity of 1000 or 1500 is used to maintain the catalyst in dense phase fluidization without substantial entrainment of catalyst particles in the gaseous effluent from the reactor.

Synthesis gas is converted into desired compounds by contact with a suitable catalyst in the reactor 4. Iron, cobalt and nickel are usually the active metals from which supported or unsupported catalysts are prepared. Promoters such as the oxides of magnesium, thorium, vanadium, manganese, etc., are employed to improve the efficiency of the catalyst. An example of a catalyst which serves well for a conversion performed in accordance with the fluid technique is an unsupported iron catalyst whose constitution may approximately be represented as follows: 94 to 97 per cent iron, 2 to 5 per cent alumina and 0 to 2 per cent alkali metal oxide such as potassia.

The heat liberated during the catalytic conversion is mainly absorbed as the latent heat of vaporization of evaporative coolant which is introduced into the reactor 4 in an atomized state. Further temperature control is provided by the absorption of heat of reaction as the sensible heat of three components, namely recycle gas, fresh synthesis gas and atomized liquid coolant.

A high percentage conversion of synthesis gas per pass is obtained making possible the attainment of high space-time yields which are essential for successful commercial operation. 90 per cent and better conversions of carbon monoxide are obtained per pass.

An effluent stream leaves the reactor 4 through a pipe 12. This effluent comprises products of conversion, a small percentage of unreacted synthesis gas and vaporized liquid coolant. A portion of the effluent is diverted from the pipe 12 through a pipe 13 through which it is led to a product recovery system which contains the conventional units of fractionation, stabilization, etc. In the product recovery system, the normally gaseous components of the effluent are separated from the normally liquid constituents which are then further separated into gasoline, gas oil, fuel oil, etc.

Another portion of the effluent from which the recycle streams are to be obtained, is diverted into a pipe 14 through which it is introduced into a vessel 15 which serves as a combination scrubber and cooler.

In the two-function vessel 15, this portion of the effluent is subjected to counter-current contact with a cooling liquid which is advantageously an absorbent for water. The liquid coolant advantageously is introduced into the vessel 15 at about 100 to 200° F. in the form of a spray through a nozzle 16 situated in the upper portion of the vessel 15. The higher boiling components of the effluent are condensed by this treatment and water vapor is removed substantially from the effluent by condensation and preferential solution in the selective absorbent which is employed as a liquid coolant. Further cooling may be effected in the vessel 15 if desired by inserting therein a coil through which a cooling medium is passed; this coil is not shown in the drawing.

Liquid coolant and condensed components of the effluent leave the vessel 15 through a pipe 17. Further treatment of this liquid phase will be described in detail later.

A gas stream comprising mainly the normally gaseous products of conversion, carbon dioxide, unreacted carbon monoxide and hydrogen issues from the vessel 15 through a pipe 18 at a temperature 200–400° F. below the temperature at which the stream of products is introduced into the vessel 15. This gas stream may be treated to remove carbon dioxide therefrom in a separate vessel or it may be used directly to effect condensation of the other recycle stream in the form of a fog.

If the gas stream issuing from the vessel 15 is to be used directly to effect condensation of the higher boiling components of the recycle gas stream, it is diverted from the pipe 18 along a pipe 19 which leads to a pump 20. From the pump 20 the cool gas stream proceeds along the pipe 21 until it combines with the other portion of the effluent from the reactor 4 which is used as a recycle stream.

As was mentioned previously, the effluent from the reactor 4 from which the recycle streams are derived is divided into two portions. Treatment of one of these portions has just been described. The other portion is diverted from the pipe 12 to a pipe 22 through which it is introduced into a separator 23 wherein entrained liquid and waxy components are separated from the gas stream. The separated liquid and waxy components flow from the separator 23 to a pipe 24 into the pipe 13 which leads to the product recovery system which has been alluded to previously.

A gas stream leaves the separator 23 through a pipe 25 at a temperature which is substantially equivalent to that maintained in the reactor 4. This gas stream proceeds through a pump 26 and a pipe 27 to the conduit 1 through which fresh synthesis gas is introduced into the reactor 4. The other recycle gas stream which is at a temperature substantially below conversion temperature also combines with the fresh synthesis gas in the conduit 1 to give a reactor feed comprising fresh synthesis gas and recycle gas.

The merging of the hot recycle gas stream with cool fresh synthesis gas and with the cool recycle gas stream results in the condensation of the higher boiling components of the hot recycle stream in a finely dispersed form. These atomized constituents of the conversion product are substantially vaporizable under the conversion conditions and serve excellently as a liquid evaporative coolant in the reactor 4.

Thus the total reactor feed introduced into the reactor 4 comprises fresh synthesis gas, recycle gas and entrained atomized evaporative coolant.

Returning to the liquid phase comprising liquid coolant such as ethylene glycol and condensed components of the effluent which leaves the vessel 15 through the pipe 17, it is introduced into a separator 30. In the separator 30, a hydrocarbon phase is separated from the heavier liquid absorbent and is led to a product recovery system through a pipe 31. This product recovery system is similar to that which has been alluded to in connection with the treatment of the portion of the effluent from the reactor 4 which is introduced into a product recovery system through the pipe 13.

The liquid coolant containing water and a major portion of the alcohols produced in the conversion leaves the separator 30 through a pipe 32 and is introduced into a fractionating column 34. In the fractionating column 34, alcohol-water azeotropes are distilled from the liquid absorbent and leaves the column 34 through a pipe 35. Water is distilled and removed from the column 34 through a pipe 36.

The high-boiling absorbent leaves the column 34 through a pipe 37 through which it is introduced into an exchanger 38 in which it is brought to the desired temperature. The coolant at the desired temperature leaves the exchanger 38 through a pipe 39 through which it is introduced into the vessel 15. The nozzle 16 is used to effect the introduction of the liquid absorbent in a finely divided form.

As indicated previously the gas stream issuing from the vessel 15 may be subjected to treatment with a selective absorbent for carbon dioxide. If this procedure is followed the gas stream is diverted from the pipe 18 through a pipe 40 into a tower 41. In the tower 41 the gas stream is subject to countercurrent contact with a cool liquid such as monoethanolamine which is a selective absorbent for carbon dioxide. By this treatment carbon dioxide is removed from the gas stream and a hydrogen-rich gas stream issues from the tower 41 through a pipe 42. This hydrogen-rich gas stream is then introduced into the pipe 19 through which it is introduced in succession through the pump 20 and the pipe 21 into the conduit 1. This cool hydrogen-rich gas stream serves the same function in the conduit 1 as has been described previously for the recycle stream which was only subjected to cooling and scrubbing with an absorbent for water; namely, it aids in the condensation of the higher boiling components of the hot recycle stream in the form of a fog.

The liquid absorbent containing absorbed carbon dioxide leaves the tower 41 through a pipe 43 which leads to a stripper 44. In the stripper 44 carbon dioxide is driven off from the liquid absorbent and a gaseous stream of carbon dioxide is discharged from the stripper 44 through a pipe 45.

Stripped absorbent leaves the stripper 44 through a pipe 46, is cooled in the exchanger 47 and is then introduced into the tower 41 through a pipe 48 and a spray nozzle 49.

By way of example, fresh synthesis gas containing carbon monoxide and hydrogen in the molecular ratio of about 1:2 is passed into a reactor 4 containing an iron catalyst of the type previously described. The iron catalyst is maintained in a fluidized state in the reactor 4.

A recycle gas containing atomized condensed constituents of the products is combined with fresh synthesis gas in the conduit 1 in the proportion of about two volumes of recycle gas to one volume of fresh synthesis gas.

The quantity of condensed atomized components in the recycle gas is regulated so that 0.2 barrel of liquid is introduced into the reactor in every thousand cubic feet of mixed synthesis gas and recycle vapor.

The total reactor feed is charged to the reactor 4 at a rate of about 1,000 cubic feet (measured at standard conditions) per cubic feet of fluidized catalyst per hour. The temperature within the reactor is maintained at about 600° F. The temperature of the reactor feed as it is introduced into the reactor 4 is about 350° to 375° F.

The yield of $C_5$ and heavier hydrocarbons separated from the effluent of a fluid operation conducted in this manner amounts to approximately one gallon of hydrocarbons per thousand cubic feet of fresh synthesis gas.

In the description of the invention, condensation in the form of a fog of the higher boiling components of the hot recycle gas has been effected by addition thereto of a cool gas stream consisting of the lower boiling products of conversion. It is contemplated that the aforesaid fog formation may be effected by injecting a cool gas or refrigerant, such as liquid pentane, through a pipe 50 into the hot recycle stream in an amount sufficient to reduce the temperature of the stream below the dew point of a portion of the higher boiling constituents of the stream.

It is contemplated that the invention may be adapted to conversions in which a plurality of stages connected in series is used. In this instance, a portion of the effluent from each stage may be withdrawn, contacted with a cooled selective absorbent for water vapor and then the cooled non-condensed components of the withdrawn effluent combined with the reactor feed to the next stage. The introduction of cool gas into the effluent from one stage as it passes to the next succeeding stage causes condensation of the higher boiling components thereof in a finely dispersed state. The condensed higher boiling components then serve as an evaporative coolant for the succeeding stage. This operation is repeated between each stage, thereby providing for atomized liquid coolant for each stage.

Obviously many modifications and variations of the invention, as hereinbefore set forth, may be made without departing from the spirit and scope thereof and, therefore, only such limitations should be imposed as are indicated in the appended claims.

I claim:

1. In the catalytic conversion of synthesis gas comprising carbon monoxide and hydrogen into hydrocarbons, oxygen-containing compounds and the like wherein heat of reaction is removed by evaporation of a finely dispersed coolant in direct contact with the catalyst, the method which comprises contacting synthesis gas in a conversion zone with a catalyst under suitable conditions to effect conversion into desired compounds, removing an effluent comprising normally gaseous and normally liquid products of conversion from said conversion zone, diverting a portion of said effluent to a product recovery system, dividing another portion of said effluent into two streams, cooling one of said streams to remove normally liquid constituents, combining cooled uncondensed gas from said cooling treatment with hot gases containing higher boiling components of the other of said streams so as to effect condensation of higher boiling components of said other stream in the form of a fog, recycling said combined stream retaining fog therein to said conversion zone to supply said coolant, and retaining a recycle ratio of recycle gas to fresh feed between 0.5 to 1 and 4 to 1.

2. In the catalytic conversion of synthesis gas comprising carbon monoxide and hydrogen into hydrocarbons, oxygen-containing compounds and the like wherein heat of reaction is removed by evaporation of a finely dispersed coolant in direct contact with the catalyst, the method which comprises contacting synthesis gas in a conversion zone with a catalyst under suitable conditions to effect conversion into desired compounds, removing an effluent comprising normally gaseous and normally liquid products of conversion from said conversion zone, diverting a portion of said effluent to a product recovery system, cooling another portion of said effluent by introduction therein of a vaporizable liquid hydrocarbon so as to effect condensation of higher boiling components of said stream in the form of a fog, recycling said treated stream which retains said fog therein to said conversion zone to supply coolant, and retaining a recycle ratio of recycle gas to fresh feed between 0.5 to 1 and 4 to 1.

3. In the catalytic conversion of synthesis gas comprising carbon monoxide and hydrogen into hydrocarbons, oxygen-containing compounds and the like wherein heat of reaction is removed by evaporation of a finely dispersed coolant in direct contact with the catalyst, the method which comprises contacting synthesis gas in a conversion zone with a catalyst under suitable conditions to effect conversion into desired compounds, removing an effluent comprising normally gaseous and normally liquid products of conversion from said conversion zone, diverting a portion of said effluent to a product recovery system, cooling another portion of said effluent by the injection of liquid pentane therein so as to effect condensation of higher boiling components of said stream in the form of a fog and recycling said cooled stream which retains said fog therein to said conversion zone.

4. In the catalytic conversion of synthesis gas comprising carbon monoxide and hydrogen into hydrocarbons, oxygen-containing compounds and the like wherein heat of reaction is removed by evaporation of a finely dispersed coolant in direct contact with the catalyst, the method which comprises contacting synthesis gas in a conversion zone with a catalyst under suitable conditions to effect conversion into desired compounds, removing an effluent comprising normally gaseous and normally liquid products of conversion from said conversion zone, diverting a portion of said effluent to a product recovery system, dividing another portion of said effluent into two recycle streams, passing one of said recycle streams to a cooling zone, effecting condensation therein of normally liquid constituents by direct contact with a liquid absorbent for water, removing resulting condensate from said condensation, combining uncondensed gas from said treatment with hot gases containing higher boiling components of the other of said recycle streams so as to effect condensation of higher boiling components of said other stream in the form of a fog, recycling said combined stream which retains said fog therein to said conversion zone to supply said coolant, and retaining a recycle ratio of recycle gas to fresh feed between 0.5 to 1 and 4 to 1.

5. The method according to claim 4 in which the cooled liquid absorbent is a glycol.

6. In the catalytic conversion of synthesis gas comprising carbon monoxide and hydrogen into hydrocarbons, oxygen-containing compounds and the like wherein heat of reaction is removed by evaporation of a finely dispersed coolant in direct contact with the catalyst, the method which comprises contacting synthesis gas in a conversion zone with a catalyst under suitable conditions to effect conversion into desired compounds, removing an effluent comprising normally gaseous and normally liquid products of conversion from said conversion zone, diverting a portion of said effluent to a product recovery system, dividing another portion of said effluent into two recycle streams, passing one of said streams to a cooling zone, effecting condensation therein of normally liquid constituents by direct contact with a liquid absorbent for carbon dioxide, removing resulting condensate from said condensation, separating at about conversion temperature liquid and waxy components from the other of said recycle streams, combining $CO_2$-free gas with said other recycle streams so as to effect condensation of higher boiling components of said other stream in the form of a fog, recycling said combined stream which retains said fog therein to said conversion zone to supply said coolant, and retaining a recycle ratio of recycle gas to fresh feed between 0.5 to 1 and 4 to 1.

7. The method according to claim 6 in which the cooled liquid absorbent is an alkylol-amine.

8. In the catalytic conversion of synthesis gas comprising carbon monoxide and hydrogen into hydrocarbons, oxygen-containing compounds and the like wherein heat of reaction is removed by evaporation of a finely dispersed coolant in direct contact with the catalyst, the method which comprises contacting synthesis gas in a conversion zone with a catalyst under suitable conditions to effect conversion into desired compounds, removing an effluent comprising normally gaseous and normally liquid products of conversion from said conversion zone, diverting a portion of said effluent into two recycle streams, passing one of said streams to a cooling zone, effecting condensation therein of normally liquid constituents by direct contact with a cool liquid absorbent for water, removing resulting condensate and water, contacting the effluent from said condensation with an absorbent for carbon dioxide, separating at about conversion temperature liquid and waxy components from the other of said streams, combining cool $H_2O$- and $CO_2$-free gas with said other recycle stream so as to effect condensation of higher boiling components of said other stream in the form of a fog, recycling said combined stream which retains said fog therein to said conversion zone to supply said coolant, and retaining a recycle ratio of recycle gas to fresh feed between 0.5 to 1 and 4 to 1.

9. The method according to claim 8 in which the cool liquid absorbent for water is a glycol.

10. The method according to claim 8 in which the cool liquid absorbent for carbon dioxide is an alkylol-amine.

HAROLD V. ATWELL.

REFERENCES CITED

The following references are of record in the file of this patent:

UNITED STATES PATENTS

| Number | Name | Date |
|---|---|---|
| 2,177,068 | Hutchinson | Oct. 24, 1939 |
| 2,243,869 | Keith, Jr. et al. | June 3, 1941 |
| 2,279,052 | Michael et al. | Apr. 7, 1942 |
| 2,406,851 | Redcay | Sept. 3, 1946 |
| 2,411,760 | Sensel | Nov. 26, 1946 |
| 2,436,957 | Eastman | Mar. 2, 1948 |

FOREIGN PATENTS

| Number | Country | Date |
|---|---|---|
| 739,569 | Germany | Oct. 4, 1943 |